US012675651B2

(12) United States Patent
Weller

(10) Patent No.: US 12,675,651 B2
(45) Date of Patent: Jul. 7, 2026

(54) INTELLIGENT DOCUMENT PROCESSING AND INFORMATION EXTRACTION USING ARTIFICIAL INTELLIGENCE

(71) Applicant: SAP SE, Walldorf (DE)

(72) Inventor: Tobias Weller, Buseck (DE)

(73) Assignee: SAP SE, Walldorf (DE)

( * ) Notice: Subject to any disclaimer, the term of this patent is extended or adjusted under 35 U.S.C. 154(b) by 238 days.

(21) Appl. No.: 18/142,707

(22) Filed: May 3, 2023

(65) Prior Publication Data

US 2024/0370665 A1 Nov. 7, 2024

(51) Int. Cl.
*G06F 17/28* (2006.01)
*G06F 18/214* (2023.01)
(Continued)

(52) U.S. Cl.
CPC ............ *G06F 40/47* (2020.01); *G06F 18/214* (2023.01); *G06F 40/186* (2020.01); *G06V 30/412* (2022.01); *G06F 40/295* (2020.01)

(58) Field of Classification Search
CPC ...... G06F 40/186; G06F 40/10; G06F 40/103; G06F 18/214; G06F 18/211; G06F 8/35; G06F 16/288; G06F 40/279; G06F 16/24573; G06F 40/295; G06F 16/345; G06F 16/13; G06F 40/205; G06F 40/44; G06F 16/86; G06F 16/84; G06N 20/00;
(Continued)

(56) References Cited

U.S. PATENT DOCUMENTS 11,775,747 B1 * 10/2023 Religa ................... G06F 40/186
715/243
11,775,764 B2 * 10/2023 Ikawa ..................... G06F 40/30
704/9
(Continued)

FOREIGN PATENT DOCUMENTS

EP 3553696 B1 * 5/2024 ............... G06N 5/02
WO WO-2024226279 A1 * 10/2024 ........... G06F 40/205

OTHER PUBLICATIONS

Allocato, A. et al., Intelligent Document Processing Demonstrates How AI Can Make a Practical Difference to Business Right Now, Abstract, Tech Buyer, May 2022, 2 pages, printed from https://www.idc.com/getdoc.jsp?containerId=EUR147282421.
(Continued)

*Primary Examiner* — Michael Ortiz-Sanchez
(74) *Attorney, Agent, or Firm* — Sterne, Kessler, Goldstein & Fox P.L.L.C.

(57) ABSTRACT
Various embodiments for intelligent document processing and information extraction using artificial intelligence are described herein. An embodiment operates by receiving user input comprising a plurality of entries indicating what values are to be extracted from one or more documents by an artificial intelligence (AI) language processing system. A schema for extracting the values is generated, and text versions of the one or more documents are received. The schema and the text versions of the one or more documents are converted into a prompt for the AI language processing system. A text-based output from the AI language processing system is received, and converted into a format to be stored on a database or displayed on the user interface.

20 Claims, 8 Drawing Sheets

(51) Int. Cl.
*G06F 40/186* (2020.01)
*G06F 40/47* (2020.01)
*G06V 30/412* (2022.01)
*G06F 40/295* (2020.01)

(58) Field of Classification Search
CPC ........ G06N 5/022; G06N 3/08; G06N 3/0475;
G06N 5/04; G06N 3/047; G06N 3/042;
G06N 3/0895; G06N 3/10; G06V 30/412;
G06V 30/10; G06V 30/00
See application file for complete search history.

(56) References Cited

U.S. PATENT DOCUMENTS

| | | | |
|---|---|---|---|
| 2018/0144042 A1* | 5/2018 | Sheng .................... | G06Q 10/10 |
| 2021/0191936 A1* | 6/2021 | Khorasani ............. | G06F 16/288 |
| 2022/0083606 A1* | 3/2022 | Drost ..................... | G06F 16/93 |
| 2022/0147698 A1* | 5/2022 | Revankar .............. | G06F 16/958 |
| 2022/0156300 A1* | 5/2022 | Paruchuri .............. | G06V 10/82 |
| 2022/0405481 A1* | 12/2022 | De Ridder ............. | G06N 5/022 |
| 2024/0281222 A1* | 8/2024 | Trummer ................. | G06F 8/35 |

OTHER PUBLICATIONS

Wiggers, K., What is intelligent document processing? Why IDP matters in the enterprise, VentureBeat, Feb. 20, 2022, 6 pages printed from https://venturebeat.com/ai/what-is-intelligent-document-processing-why-idp-matters-in-the-enterprise/.

\* cited by examiner

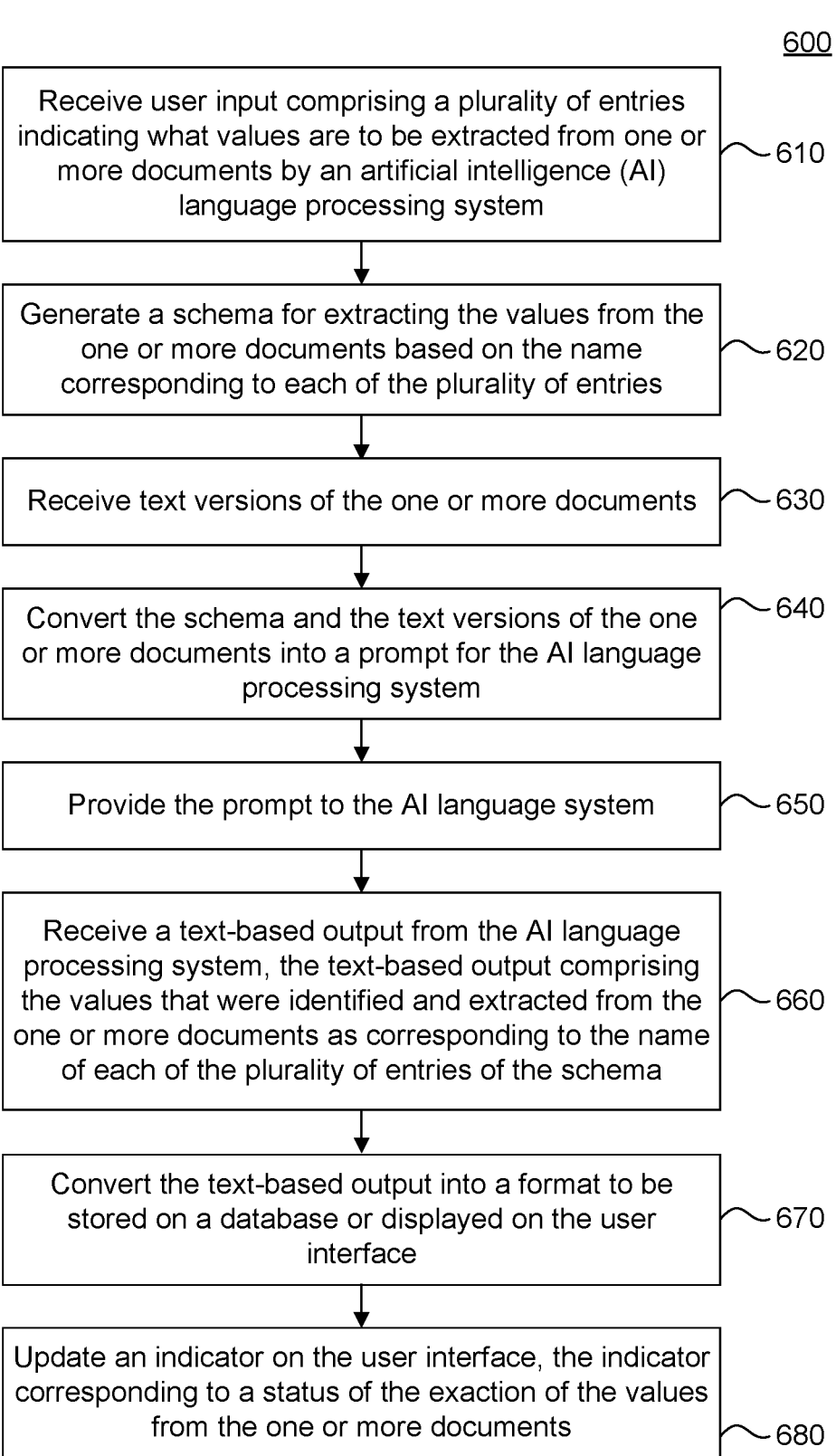

600

Receive user input comprising a plurality of entries indicating what values are to be extracted from one or more documents by an artificial intelligence (AI) language processing system — 610

Generate a schema for extracting the values from the one or more documents based on the name corresponding to each of the plurality of entries — 620

Receive text versions of the one or more documents — 630

Convert the schema and the text versions of the one or more documents into a prompt for the AI language processing system — 640

Provide the prompt to the AI language system — 650

Receive a text-based output from the AI language processing system, the text-based output comprising the values that were identified and extracted from the one or more documents as corresponding to the name of each of the plurality of entries of the schema — 660

Convert the text-based output into a format to be stored on a database or displayed on the user interface — 670

Update an indicator on the user interface, the indicator corresponding to a status of the exaction of the values from the one or more documents — 680

FIG. 6

Computer System 700

INTELLIGENT DOCUMENT PROCESSING AND INFORMATION EXTRACTION USING ARTIFICIAL INTELLIGENCE

BACKGROUND

Using machine learning for document processing usually relies on the manual creation of templates and/or annotated documents by users. These templates often include labeling the information on a document and indicate where in the document the information can be found. Creating these templates requires significant time, effort, and computing capacity, and is prone to human errors. Furthermore, these templates are usually inflexible and require manual updating each time a new layout or document is introduced to the system. These limitations make conventional document processing using machine learning unsuitable suitable for large scale document processing tasks which include a variety of different documents and/or document formats.

BRIEF DESCRIPTION OF THE FIGURES

The accompanying drawings are incorporated herein and form a part of the specification.

FIG. 6 is a flowchart illustrating a process for a data processing and extraction system (DES), according to some embodiments.

In the drawings, like reference numbers generally indicate identical or similar elements. Additionally, generally, the left-most digit(s) of a reference number identifies the drawing in which the reference number first appears.

DETAILED DESCRIPTION

Using machine learning for document processing usually relies on the manual creation of templates and/or annotated documents by users. These templates often include labeling the information on a document and indicate where in the document the information can be found. Creating these templates requires significant time, effort, and computing capacity, and is prone to human errors. Furthermore, these templates are usually inflexible and require manual updating each time a new layout or document is introduced to the system. These limitations make conventional document processing using machine learning unsuitable suitable for large scale document processing tasks which include a variety of different documents and/or document formats.

As noted above, when using machine learning templates for document processing, a user may need to manually create the various templates by marking and labeling the different areas where information is found with a bounding box or other indicator so that the system may 'learn' where to look for particular information and how to label that information. For example, on a resume or CV (curriculum vitae), a user may need to mark an area of the resume where the name of the applicant is found, by drawing a box around the name of the applicant and labeling the box 'name of applicant'. The user may need to do this on numerous different resumes, which is a manual and time and resource consuming process. This manual and resource consuming process becomes more computing and labor intensive when different resumes have different formats or information, and the different variations needs to be accounted for by the system. For example, some resumes may include the name of the applicant on the top, while others include the name or the side or the bottom of a page. Each resume can have a different layout, which makes creating templates burdensome and inefficient. Annotated documents may be used to train an artificial intelligence model, but again this process requires the manual annotation of documents and is extremely time and resource intensive, and requires new annotations for new types of documents.

Figure 1:
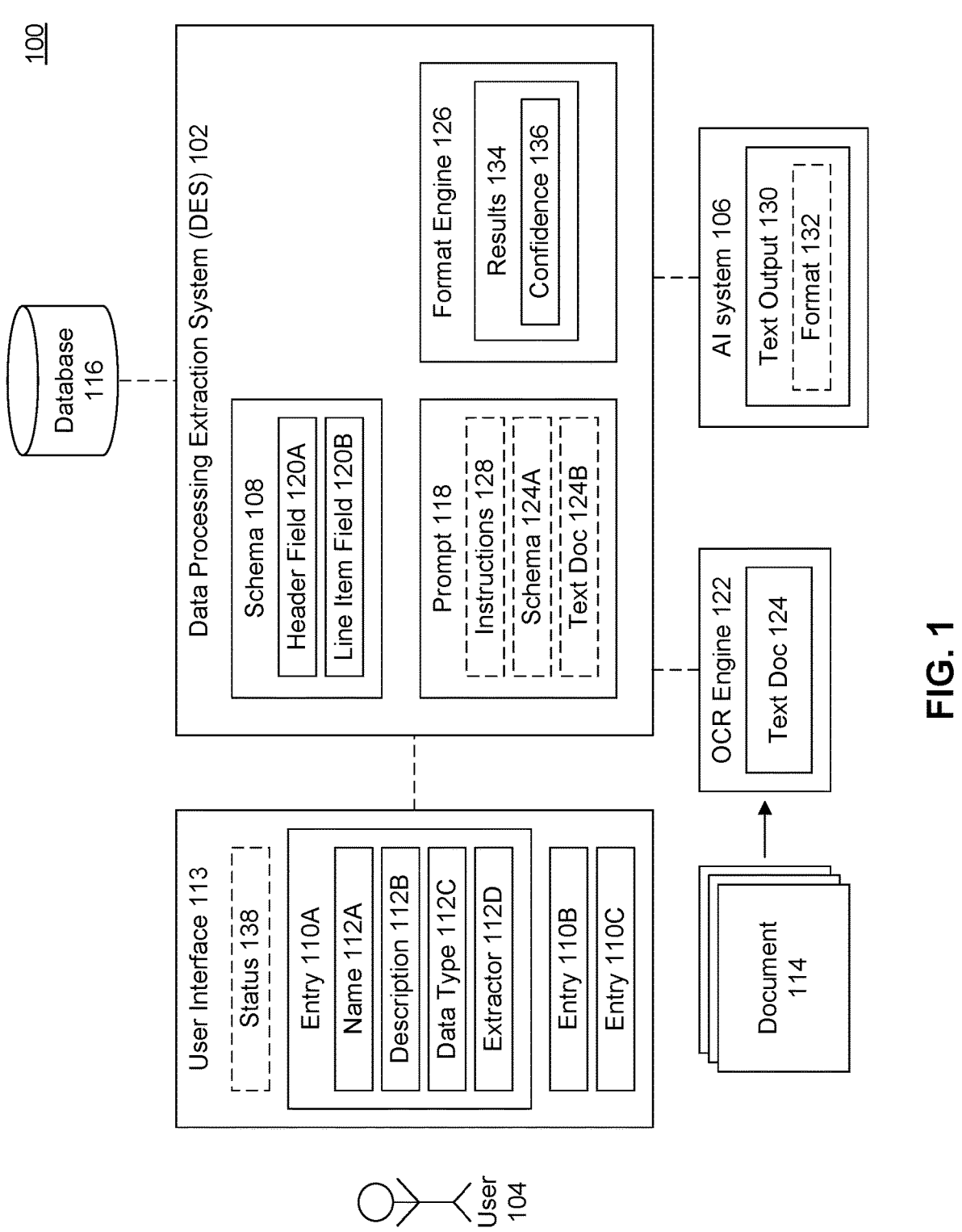
FIG. 1 illustrates a block diagram illustrating a data processing and extraction system (DES), according to some example embodiments.

FIG. 1 illustrates a block diagram 100 illustrating a data processing and extraction system (DES) 102, according to some example embodiments. In some embodiments, DES 102 may perform intelligent document processing without requiring a user 104 to create templates for a set of undefined documents 114 (e.g., documents 114 with varying formats, layouts, information, languages, and structures). In some embodiments, DES 102 may leverage the capabilities of an artificial intelligence (AI) system 106 which may reduce the overhead required to process documents and improve the speed and accuracy of intelligent document processing while minimizing user involvement and reducing overall resource consumption.

In some embodiments, DES 102 may receive inputs from a user 104 indicating what information the user 104 wants extracted from a set of documents 114. DES 102 may then reformat the user inputs and documents 114 into a prompt 118 which may include a format and structure that is understandable by the AI system 106. DES 102 may then receive the text output 130 from the AI system 106, and reformat the text output 130 into a set of result 134 for storage in a database 116, display via a user interface 113, and/or other document processing as may be instructed by the user 104.

In some embodiments, the AI system 106 may include an AI language processing system that is built to understand and respond to user requests that may be entered or provided to AI system 106 as normal conversational language input (e.g., as opposed to a computer language or code). An example of an AI system 106 is a GPT (generative pretrained transformer) system, which may be trained to read and write like a human in conversational language, using text. In some embodiments, AI system 106 may use its pre-trained intelligence to produce grammatically correct output. The AI system 106 may be trained to respond to virtually any user input and respond to it using conversational language (e.g., as a human would respond), but in a fraction of the time. In some embodiments, the AI system 106 may analyze input text and write a new article or produce other output.

In some embodiments, DES 102 may leverage the capabilities of the AI system 106 to perform intelligent document processing on a set of documents 114. In some embodiments, the documents 114 may include a stack of thousands of paper invoices from different vendors or clients which have been paid or need to be paid. The user 104 may want to input the information from documents 114 into a database 116. It would take a user 104 an extraordinary amount of time and computing resources to manually review and enter all the information (e.g., such as purchase date, supplier, quantity, materials, price, tax, location, etc.) from each of the invoices into database 116. Additionally this process would be subject to human error.

Similarly, it would take a large amount of time to develop templates for the invoices, particularly if the invoices are from different merchants, include different information, which may be in different formats or languages. Templates would also be another inefficient, resource and time intensive approach to document processing.

Rather than requiring a user to create a library of templates with annotations with correct outputs, DES 102 may automatically generate a schema 108 for a user 104 based on one or more user entries 110A-C received via a user interface 113 of DES 102. DES 102 may use the schema 108 to perform intelligent document processing on the documents 114. For example, the schema 108 may be used to generate the prompt 118 (or multiple prompts 118) which is provided as pre-formatted input that is understandable to the AI system 106.

DES 102 may then reformat the output from the AI system 106, and store the returned information into database 116, while flagging any errors or anomalies for review by the user 104 prior to or after entry into database 116. DES 102 saves both time and computing resources while increasing the accuracy relative to performing similar document processing tasks using manual review or templates.

Schema 108 may be an outline indicating what information or values the user 104 is looking for or wants extracted from one or more documents 114. Schema 108 may also indicate what document processing or data transformations are to be performed (if any). Schema 108 may include an intermediary formatted version of one or more entries 110 provided or selected by a user 104. For example, schema 108 may be an intermediary version of what information is to be identified and extracted from the documents 114 that is generated by DES 102 after receiving one or more entries 110A-C from user 104 and before generating a prompt 118 for AI system 106.

Entries 110A-C are examples of information that a user 104 wants identified and extracted from documents 114. Entries 110A-C may be included in a schema 108, and may be input by a user 104 and/or selected by the user 104 via a user interface 113. Entries 110A-C may be referred to generally herein as entry 110 or entries 110. For simplicity, only three entries 110 and only the details of one entry 110A are illustrated, however, it is understood a user 104 may input, select, or modify any number of entries 110 and may include additional details similar to those described with respect to entry 110A.

Inside of entry 110A, a select number of fields 112A-D are provided for illustrative purposes only (other entries 110B, C may include similar or different fields 112). Other embodiments may include fewer, more, or different fields 112A-D. Fields 112A-D may be referred to generally herein as field 112 or fields 112. The example fields 112 illustrated include a name field 112A, a description field 112B, a data type field 112C, and an extractor field 112D. The user 104 may provide values for a subset of the fields 112 via user interface 113.

The name field 112A may allow a user 104 to type in a name identifying the information that the user 104 wants DES 102 to extract from the documents 114. In some embodiments, the entry into name field 112A does not correspond to any particular pre-existing or pre-defined structure or label of a document 114. For example, while a spreadsheet, table, or XML (extensible markup language) may be structured in which different fields have specific names which are used to refer to the values in those fields, the documents 114 may include unstructured documents that simply include various unlabeled and untagged information. In some embodiments, the unstructured documents 114 do not have any consistent or specific field names to search. Any of the information of a document 114 may be referred to with multiple different names that may be provided in the name field, which may identify and cause DES 102 to return the same information.

For example, a printed out and scanned receipt from a purchase may include the name of the retailer from which the purchase was made. While a first user may refer to the name of the retailer as the "StoreName", a second user may refer to the name of the retailer as the "merchant", while a third user refers to the name of the retailer as "Business-Name". All three entries into the name field 112A may be interpreted by AI system 106 as referring to the retailer name, because the receipt has no specifically labeled or identified fields so the user 104 is free to entry any name into the name field 112A that signifies the information sought to be identified and extracted from the document 114. The entry or value provided by the user 104 in the name field 112A may be similar to how a user may describe a particular piece of information in normal spoken language.

In some embodiments, the name field 112A may prohibit spaces or other special characters from being included in the entered name. Examples of names include: FullName, Name, teamCity, location, address, phone number, phone, telephone. As noted above, different users 104 may use different names to describe the same information from a document 114.

Description 112B may include text that provides supplemental information or greater context about the value provided as name 112A. For example, if the name field 112A includes the value "merchant" description 112B may include a further clarification on what the value "merchant" is referring to, such as "the name of the store identified on the receipt". Another user may provide a description 112B of "the name and address of the retailer". Or, for example, with regards to processing a resume, for the name value ApplicantName, description 112B may then include the text: "both first and last name, but not middle name or middle initial". Description 112B may include further information that makes identifying the name 112A easier, faster, and/or more accurate. In some embodiments, the description 112B may include data processing or transformation instructions. For example, "Price" is the name field 112A, may include the description 112B "convert into US dollars", because the price may be in Euros.

In some embodiments, description 112B may include a range of values or type of data that is expected in the name field 112A. For example, if the document 114 includes the locations of different apartments around the world, while name 112A may include the value "city" for a particular entry 110, description 112B may indicate "only when city is New York City or NYC", if the user 104 only wants the apartments located in NYC. Then, for example, DES 102 may flag those apartments whose city is New York City or NYC, or may conversely flag any apartment information whose city is not New York City or NYC.

Or for example, the expected price (in name field 112A) of items purchased may be "less than or equal to $100" as provided in description 112B. Then, for example, prices of more than $100 may be discarded, ignored, flagged/highlighted, or provided with a lower confidence 136 (as will be discussed on greater detail below). In some embodiments, description 112B may be an optional field.

Data type 112C may include a type of data or value that is expected to be found in the name field 112A. For example, firstname may be associated with a string value (data type 112C), while price is expected to be a currency or numeric value (data type 112C). In some embodiments, data type 112C may allow the user to select from a set of known or expected datatypes such as: string, currency, integer, real, Boolean, date, etc. And the date value or data type 112C may include different formats (e.g., MM/DD/YYYY or DD/MM/YYYY).

In some embodiments, the extractor field 112D may be used to leverage existing templates or machine learning (ML) models. For example, DES 102 may allow a user to import pre-defined field from pre-existing template or ML model, to be imported into DES 102 as the name field 112A. Extractor field 112D is an optional field that allows a user 104 to leverage any work that may have previously been done in creating templates for other or previous document processing tasks.

Once user 104 has filled in one or more fields 112 in each of one or more entries 110, DES 102 may generate the schema 108. As referenced above, schema 108 may be an intermediary, formatted version of the entries 110 provided by user 104. The schema 108 may provide an overview of what information the user 104 is seeking from the documents 114. In some embodiments, DES 102 may save a schema 108 created by a first user 104 and allow that schema 108 to be opened used and edited by a second user 104. Then, the second user 104 could bypass providing input for entries 110, or may edit the entries 110 in the loaded schema 108 as needed.

In some embodiments, schema 108 may divide entries 110 into a header field portion 120A and a line item field portion 120B. In some embodiments, a header field 120A may include information that is usually found only once in a document 114. A line item field 120B, by contrast, may be found in a tabular or body portion of a document 114, and may occur multiple times in the document. For example, a receipt from a purchase may include one store name (header field 120A), but multiple items and prices of those items that were purchased (line item fields 120B). In some embodiments, the user 104 may adjust which entries 110 are header fields 120A and line item fields 120B in schema 108.

The same selected schema 108 may be used to extract particular information from each document 114 of a set of documents 114. The user 104 may create or select the schema 108 to be used for the documents 114 (FIG. 1 illustrates a set of documents, but for simplicity, only the top documents is labeled document 114, the set of documents 114 may include any number of documents).

In some embodiments, the documents 114 may include paper receipts or invoices, which may have been scanned into an electronic form or for which a digital image may have been taken. In some embodiments, the scanned documents 114 may be provided to an OCR (optical character recognition) engine 122. OCR engine 122 may be configured to identify and extract alphanumeric text and characters from images, such as scanned images or photographs of documents 114. OCR engine 122 may generate a text document 124 for each input document 114.

In some embodiments, documents 114 may include files with text that is already computer readable, such as a word processing document, or spreadsheet file or electronic presentation document. However, in these situations, OCR engine 122 may still convert the documents 114 into a text documents 124, which will be used in generating prompt 118 for AI system 106. DES 102 may receive or have access to a set of text documents 124 (for simplicity, a single text document 124 is illustrated, but it is understood there may be a set of any number of text documents 124, each of which corresponds to a document 114).

In some embodiments, a format engine 126 may generate a prompt 118 which will be input to AI system 106. In some embodiments, prompt 118 may include schema 108A, text doc 124A, and instructions 128. The contents of schema 108A may be identical to the contents of schema 108 (as was displayed for the user 104 via user interface 113), however schema 108A may be formatted by format engine 126 to be in a form that is acceptable and understandable as input to AI system 106 to what information is to be extracted from one or more text docs 124A. Similarly, text document 124A may include contents identical to text document 124, but in a format that is acceptable and understandable to AI system 106 as the corpus of information to be searched and from which the values or information from schema 108A is to be extracted.

In some embodiments, format engine 126 may include one or more additional instructions 128 (not included in either schema 108 or text doc 124) that may help add clarity to the processing of schema 108A and/or text doc 124A by AI system 106. In some embodiments, the instructions 128 may include a desired form of output (e.g., what type of file type or format 132 is desired). DES 102 may automatically generate instructions 128 for prompt 118 after receiving a selection of schema 108 and one or more text documents 124. In some embodiments, prompt 118 may include a single text file. In some embodiments, prompt 118 may include multiple text files, each corresponding to a different text document 124 to be processed.

In some embodiments, AI system 106 may receive prompt 118 and generate a text output 130 in a particular format 132 (the type of format 132 of output 130 may be indicated by instructions 128). Text output 130 may include information, as indicated by schema 108A, that has been identified in and extracted from the text doc(s) 124A, into text output 130. In some embodiments, text output 130 may include labels for the extracted information corresponding to the names provided in name field 112A. Format 132 may indicate what type of file format is generated and that includes text output 130.

The text output 130 may be received or retrieved by DES 102 and provided to format engine 126. Format engine 126 may re-format text output 130 as results 134 for storage in database 116, visual output via user interface 113, and/or other processing. In some embodiments, DES 102 may update a status 138 indicating the current stage of processing the one or more documents 114. When results 134 are generated, the status 138 may be updated from in progress to ready (e.g., ready for review or new processing).

In some embodiments, results 134 may include a confidence score 136. Confidence 136 may indicate a level of confidence that the information extracted from text doc 134A corresponds to a particular name 112A (and description 112B and/or data type 112C) in schema 108A. Different text documents 124A may include different information in different formats, and as such, not all text documents 124A may include all the requested information from schema 108A. Or, for example, the user's input for name 112A and/or description 112B may have been unclear to the AI system 106 for one or more of the documents 114 that were processed as text docs 124A.

In some embodiments, if the confidence 136 is below a threshold, the scanned versions those documents 114 may be provided via user interface 113 with the results 134 and the confidence 136, for a user to perform manual review prior to entry in database 116 or performing other requested processing (e.g., see FIG. 4).

In some embodiments, DES 102 may compare the text output 130 or results 134 to information that is stored in database 116, and may flag documents 114 and/or information extracted from the documents 114, when there is no corresponding entry in database 116 (or if there is a duplicate entry in database 116). For example, documents 114 may be invoices from existing clients. DES 102 may compare the client name extracted from text documents 124A to existing client names as they exist in a table of database 116. And, if any extracted client name does not exist in the table, then that invoice (e.g., text doc 124A or document 114) may be flagged for manual user review. Or, for example, documents 114 may be a stack of resumes, and if any of the applicant names match the name of an existing employee in or previous applicant to company as indicated by a table of database 116, that duplicate may be flagged by DES 102 and provided for user review (e.g., see FIG. 4).

Figure 2A:
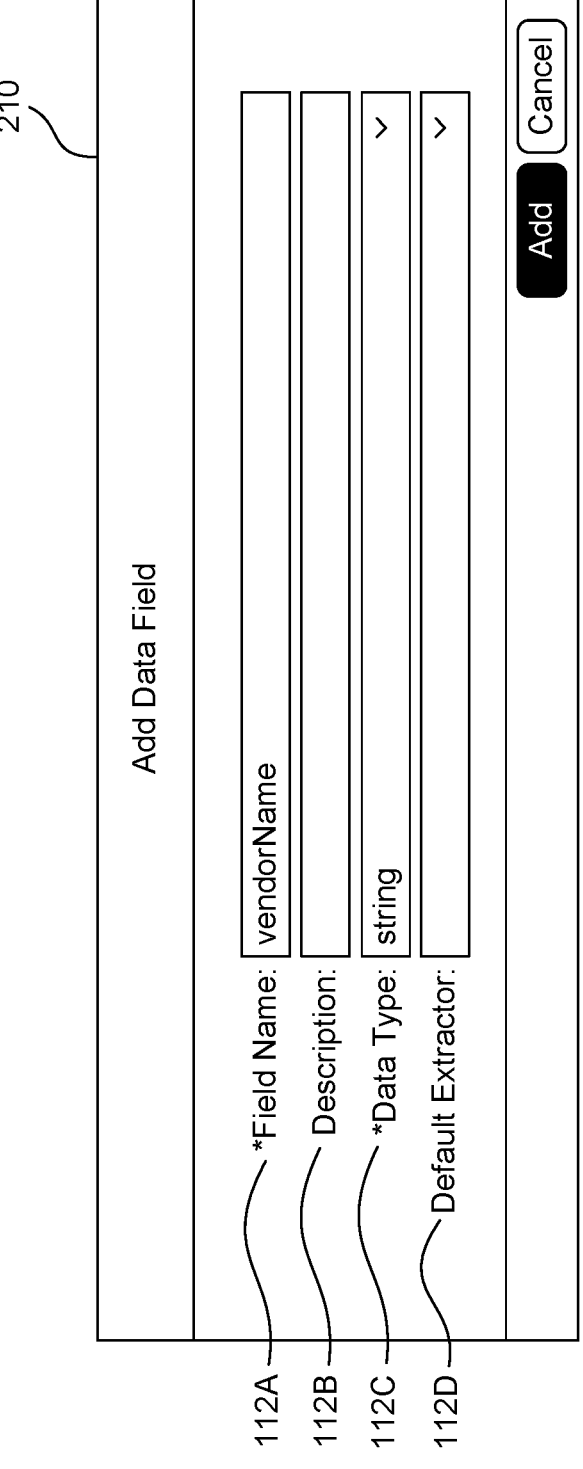
FIG. 2A is an example of a user interface window that is configured to receive input from a user for an entry, according to some embodiments.

FIG. 2A is an example of a user interface window 210 that is configured to receive input from a user 104 for a field 112 or entry 110, according to some embodiments. The example window 210 includes four boxes corresponding to fields 112A-D of FIG. 1. In some embodiments, window 210 may include different fields 112. While the name field 112A and description field 112B may allow the user to type in any text, the data type field 112C may be a drop down box with a list of known data types. The extractor field 112D may launch a new window that allows the user 104 to select one or more files to import and/or from which to select a field for the name field 112A and/or description field 112B.

Figure 2B:
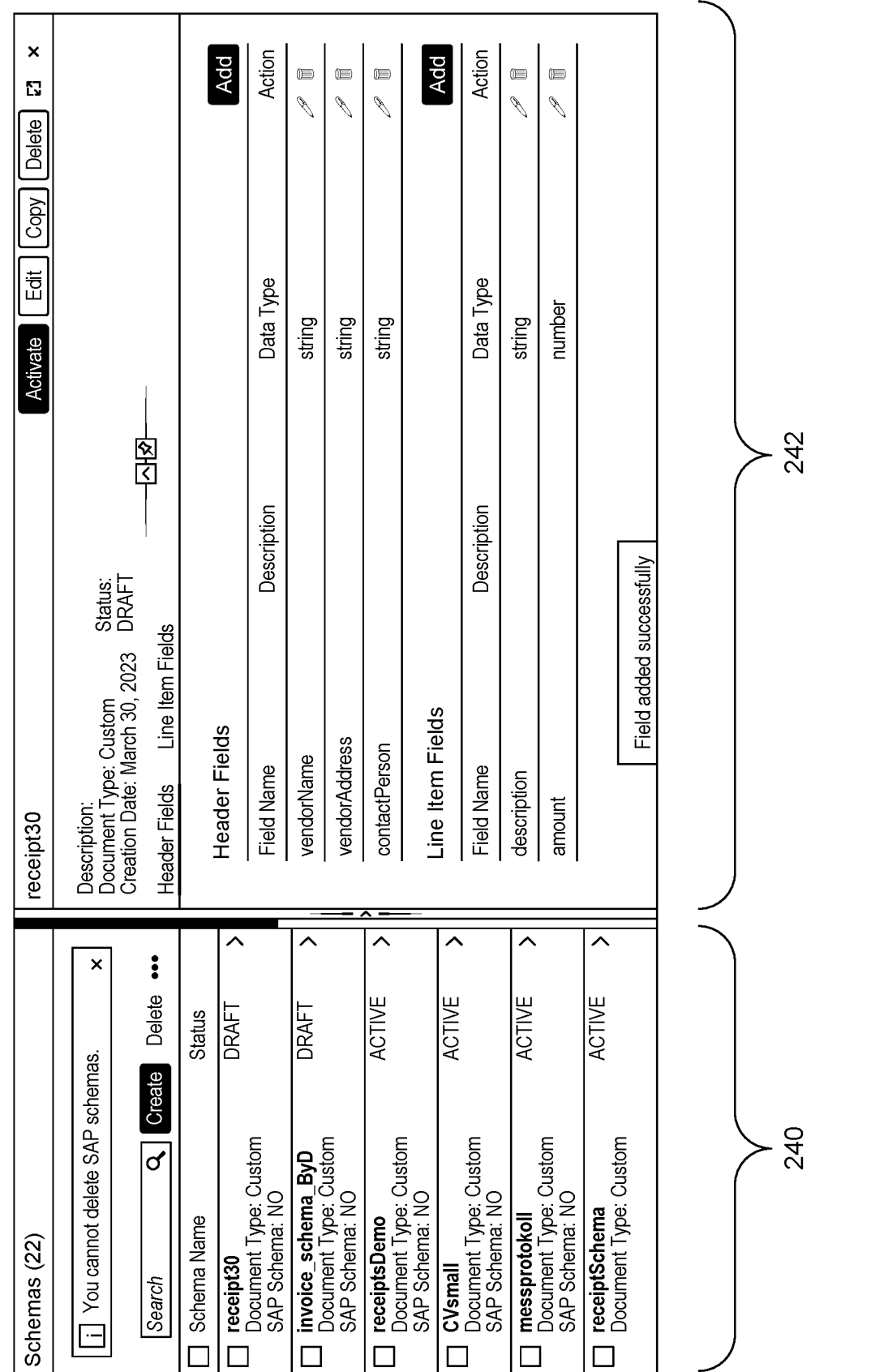
FIG. 2B is an example of a user interface that is configured to allow a user to select and modify a schema, according to some embodiments.

FIG. 2B is an example of a user interface 212 that is configured to allow a user 104 to select and modify a schema 108, according to some embodiments. The box 240 lists various saved schemas 108 that a user 104 may select for use and/or modification. The box 242 displays the details of an active or selected schema 108, apportioned into header fields and line item fields. As illustrated, the vendorName from FIG. 2A has been added to the schema illustrated in box 242 of FIG. 2B.

Figure 3:
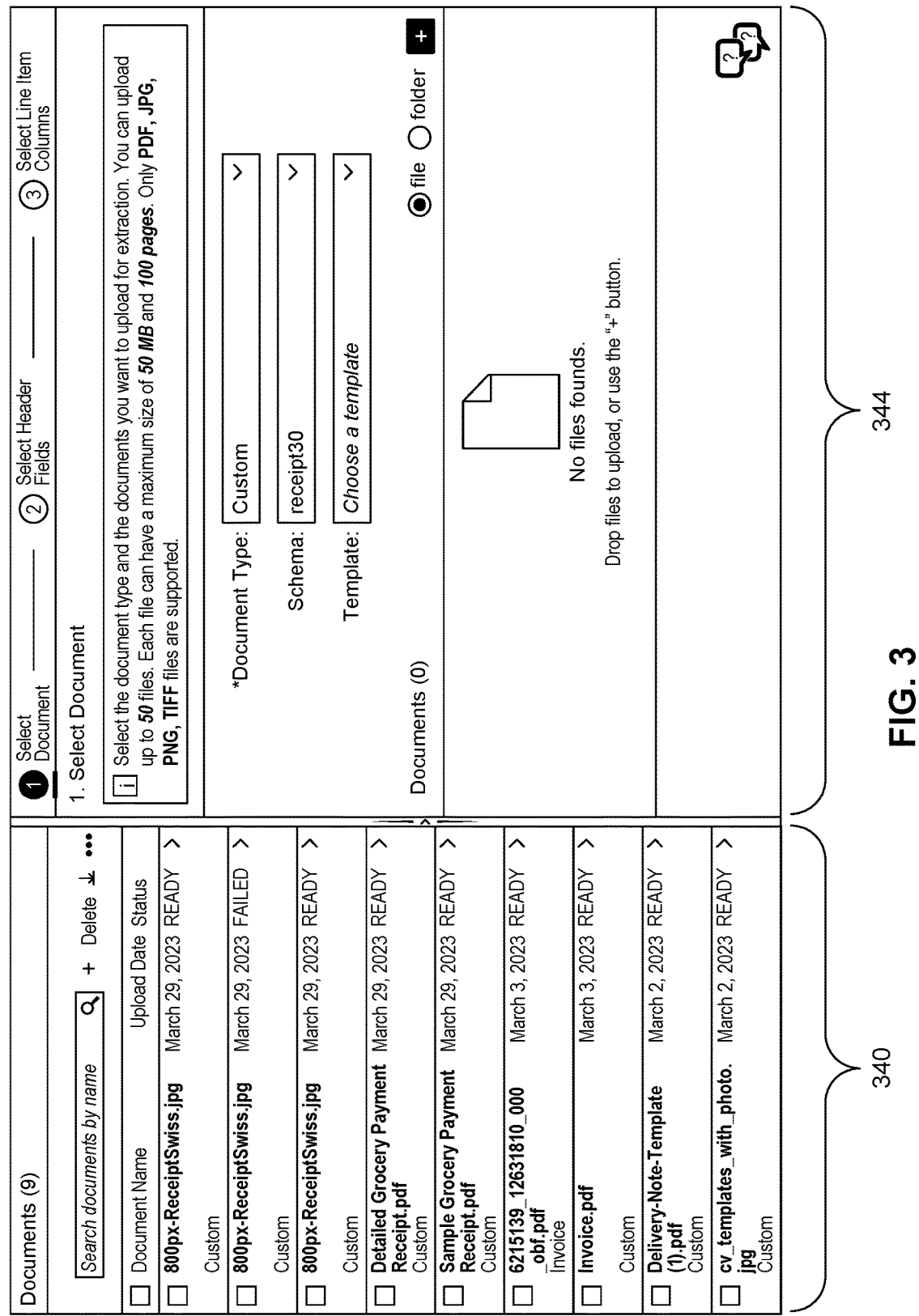
FIG. 3 is an example of a user interface configured to allow a user to select one or more documents and a schema for processing by DES, according to some embodiments.

FIG. 3 is an example of a user interface 312 configured to allow a user 104 to select one or more documents 114 and a schema 108 for processing by DES 102, according to some embodiments. As illustrated in box 344, a user may select a schema (or the system may display the previously selected schema 108 as illustrated in FIG. 2B), and may select or drag-and-drop one or more files to be analyzed based on the selected schema 108.

Box 340 illustrates various documents that have been uploaded, scanned, and/or converted to text docs 124 from which a user 104 may select for analysis with the selected schema 108. A user 104 may also scan or select additional/different documents not illustrated in box 340. In some embodiments, if a user selects an image file (which may include a portable document format or .pdf file), then DES 102 may provide the selected image file to an OCR engine 122 to receive a text document 124 corresponding to the image file, the text document 124 being in any text-searchable format-including, but not limited to, a word processing document, text file, or spreadsheet.

Figure 4:
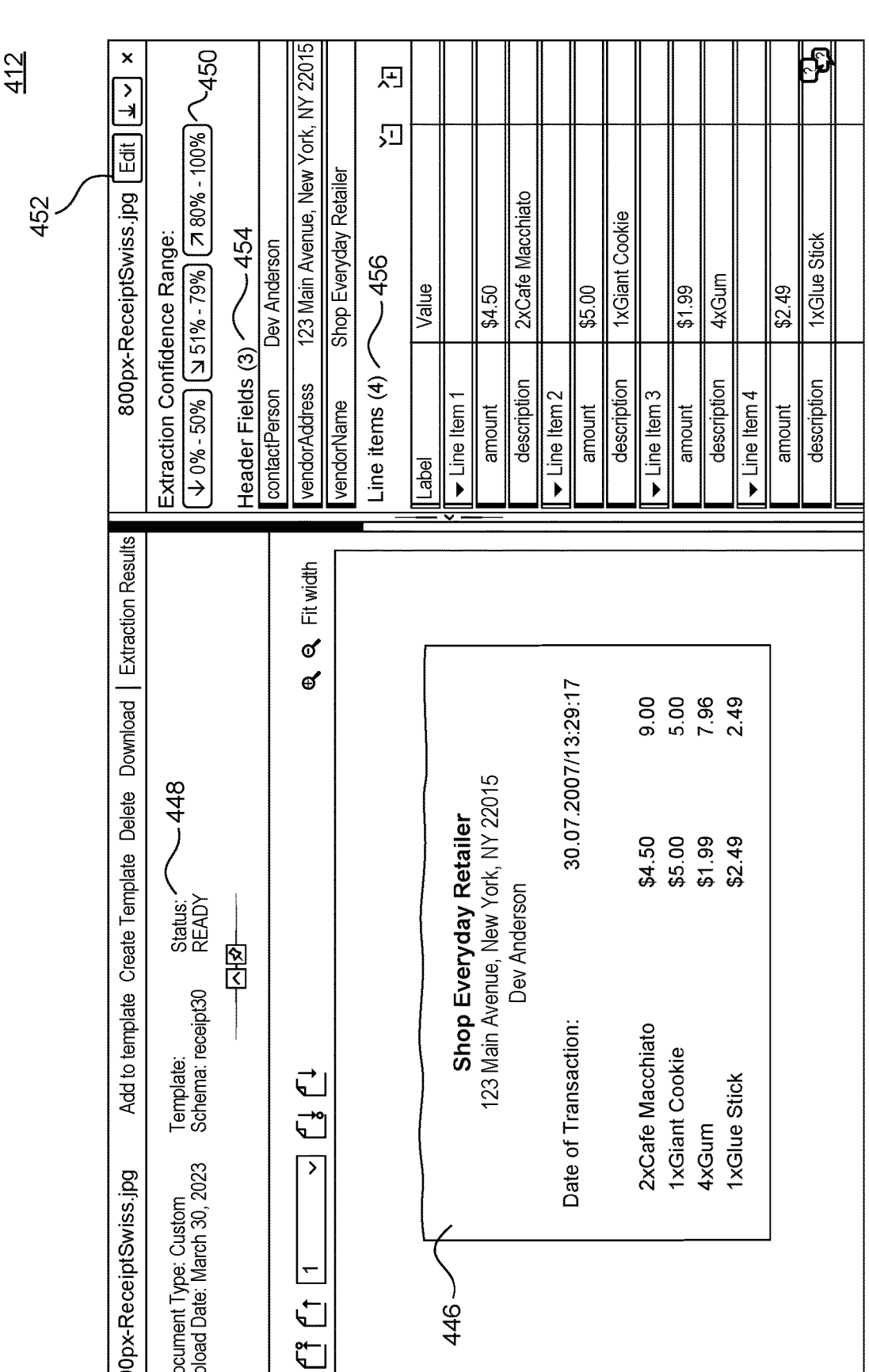
FIG. 4 is an example user interface displaying exemplary results that may be generated by DES after processing a document by AI system, according to some embodiments.

FIG. 4 is an example user interface 412 displaying exemplary results 134 that may be generated by DES 102 after processing a document 114 by AI system 106, according to some embodiments. Box 446 displays an image of the document 114 that was scanned and provided to CR engine 122. In the example illustrated, the document 114 is a receipt.

Section 454 of the user interface 412 illustrates the values identified and extracted for each of the header fields, and section 456 illustrates the values identified and extracted from the line item fields.

In section 450, a user can see the confidence 136 in the accurateness of the identified and extracted information overall. In some embodiments, if the user places their mouse over one of the extracted values, the user interface 412 of DES 102 may display a confidence level 136 of that particular value. In some embodiments, any values with a confidence 136 below a threshold (e.g., 70%) may be highlighted on the user interface 412 (e.g., displayed in a different color, displayed with a color highlighting the text, bolded, underlined, etc.).

Through user interface 412, a user 104 may compare the extracted information to a scanned version or image of the document 446 to determine whether the extracted information matches that which is displayed. If there is a mismatch, then the user may use button 452 to edit the values before they are stored in database 116. Or, for example, the user may edit the schema 108 that was used with this document 114 to address the issues. For example, the user 104 the name 112A, description 112B, and/or data type 112C field values and rerun the schema against one or more documents to test and see if the error was addressed.

A status 448 is displayed on the user interface (which may be an example of status 138 of FIG. 1). The status 448 may be an indicator that shows a status of processing of the documents 114. For example, the status 448 may begin with "not started" while a user 104 is modifying a schema 108 and selecting documents. While the documents 114 are being analyzed in view of a selected schema 108, the status 448 may indicate "in progress" and in some embodiments, provide a percentage, time, or other indicator as to how much of the analysis or processing has completed and/or is remaining. Once the results 134 are generated and displayed by format engine 126, the status 448 may change to "ready" indicating that the results are ready for review. In some embodiments, if a user reviews a particular document via user interface 412, the status 448 for that document can be updated to "completed" "reviewed" or "error" if the user 104 wants to flag the document for further or later review.

Figure 5:
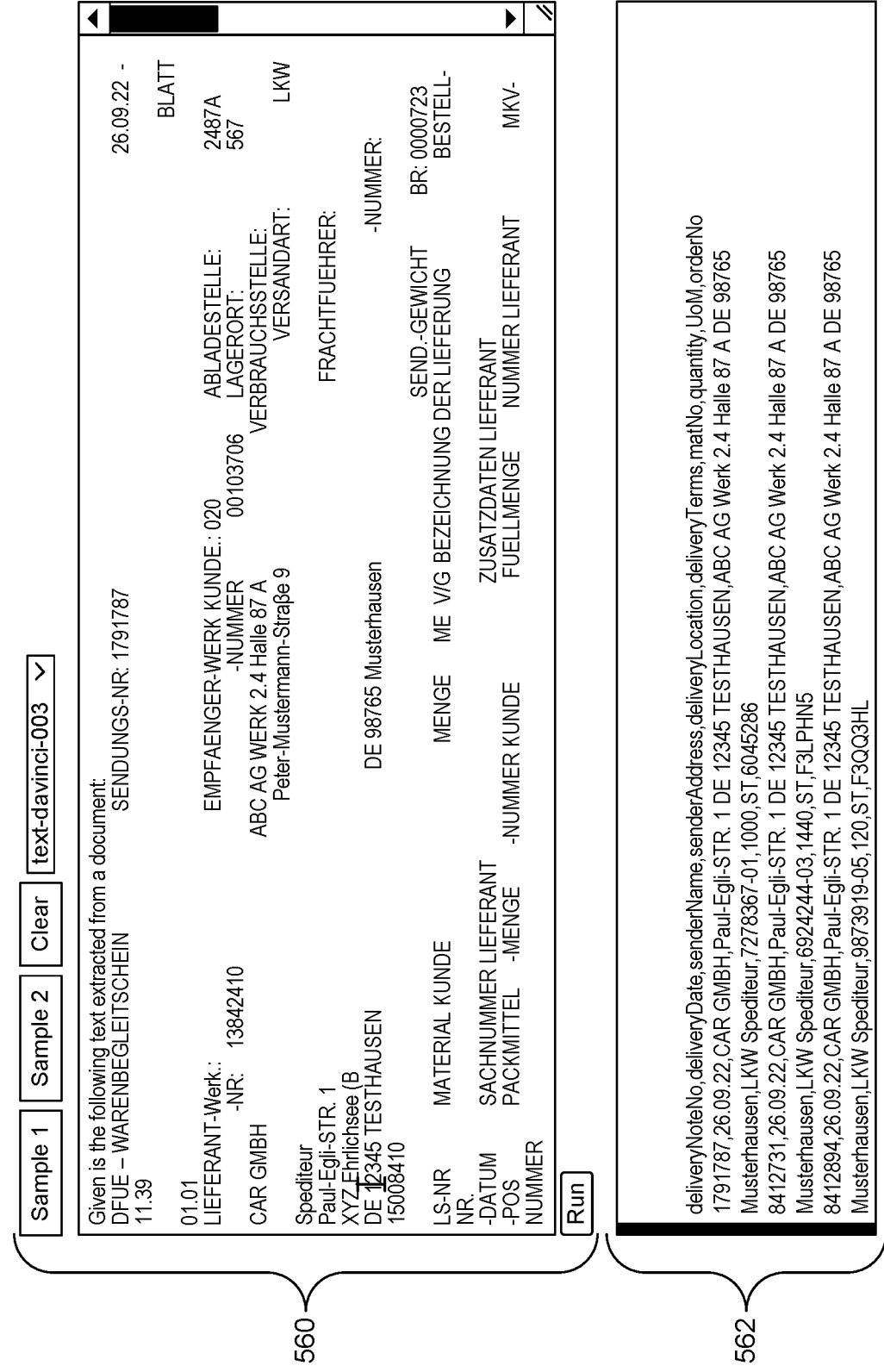
FIG. 5 illustrates an example interface for AI system, according to some embodiments.

FIG. 5 illustrates an example interface 558 for AI system 106, according to some embodiments. Input box 560 illustrates an area where a user can provide input to the AI system 106. The illustrated input in the input box 560 is an example prompt 118 generated by DES 102 and provided to AI system 106. The first line of the prompt "Given is the following text extracted from a document:" is an example instruction 128 that was generated by DES 102 for prompt 118.

Section 562 illustrates an example of text output 130 that may be generated by AI system 106. As illustrated, each extracted value may be aligned with the corresponding field value 112. For example, the deliverynoteno (which may be an example name 112A), was 1791787 as identified and extracted from the document 114. The next value is the delivery Date.

FIG. 6 is a flowchart illustrating a process 600 for a data processing and extraction system (DES) 102, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. Method 600 shall be described with reference to the figures.

In 610, user input comprising a plurality of entries indicating what values are to be extracted from one or more documents by an artificial intelligence (AI) language processing system is received. For example, DES 102 may receive values for fields 112A-D for an entry 110A from user 104 through user interface 113. Each of the entries 112A-C may include at least a name field 112A describing the data to be identified in and extracted from one or more documents 114.

In 620, a schema for extracting the values from the one or more documents based on the name corresponding to each of the plurality of entries, the schema comprising the plurality of entries is generated. For example, DES 102 may generate a schema 108 corresponding to the entries 110A-C received from the user 104. In some embodiments, the user 104 may select a previously created schema 108. The user 104 may then optionally update or modify any of the fields 112.

In 630, text versions of the one or more documents are received. For example, the documents 114 to be processed may be provided to an OCR engine 122 (which may be part of the DES 102), to generate a text document 124 for each provided document 114. The text document 124 may include any document format with searchable text. In some embodiments, the original documents 114 may be scanned images, screenshots, or pictures of paper documents or other documents. Example documents include identification cards, resumes, invoices, receipts, etc.

In 640, the schema and the text versions of the one or more documents are converted into a prompt for the AI language processing system. For example, DES 102 may generate a prompt 118 including text from schema 108 as schema 108A and text from one or more text documents 124 as text document 124A. Prompt 118 may also include one or more directives or instructions 128 to AI system 106 regarding the processing of the schema 108A and/or text document 124A. The instructions 128 may be added and provide context or commands to AI system 106 as to what to do with the schema 108A and text document 124A. In some embodiments, the instructions 128 may include or specify a particular output format 132.

In 650, the prompt is provided to the AI language processing system. For example, as illustrated in input box 560 of FIG. 5, DES 102 may copy and paste text from prompt 118 to input box 560 and select the Run command.

In 660, a text-based output from the AI language processing system is received, the text-based output comprising the values that were identified and extracted from the one or more documents as corresponding to the name of each of the plurality of entries of the schema. For example, as illustrated in box 562, DES 102 may receive or have access to text output 130 from AI system 106. The text output 130 illustrated in box 562 includes the names 112 of the entries 110 and the corresponding values that were identified and extracted from the text documents 124A. In some embodiments, the text output 130 may include a confidence value 136 for each value, or any value that falls below a confidence threshold (which may be specified in instructions 128).

In 670, the text-based output is converted into a format to be stored on a database or displayed on the user interface. For example, format engine 126 may convert the text output 130 into results 134, for storage in database 116 and/or display in user interface 113. FIG. 4 illustrates an example of results 134 that have been formatted for output and/or user verification.

In 680, an indicator on the user interface is updated, the indicator corresponding to a status of the extraction of the values from the one or more documents. For example, FIG. 4 illustrates a status 448 (which may be an example of status 138).

Figure 7:
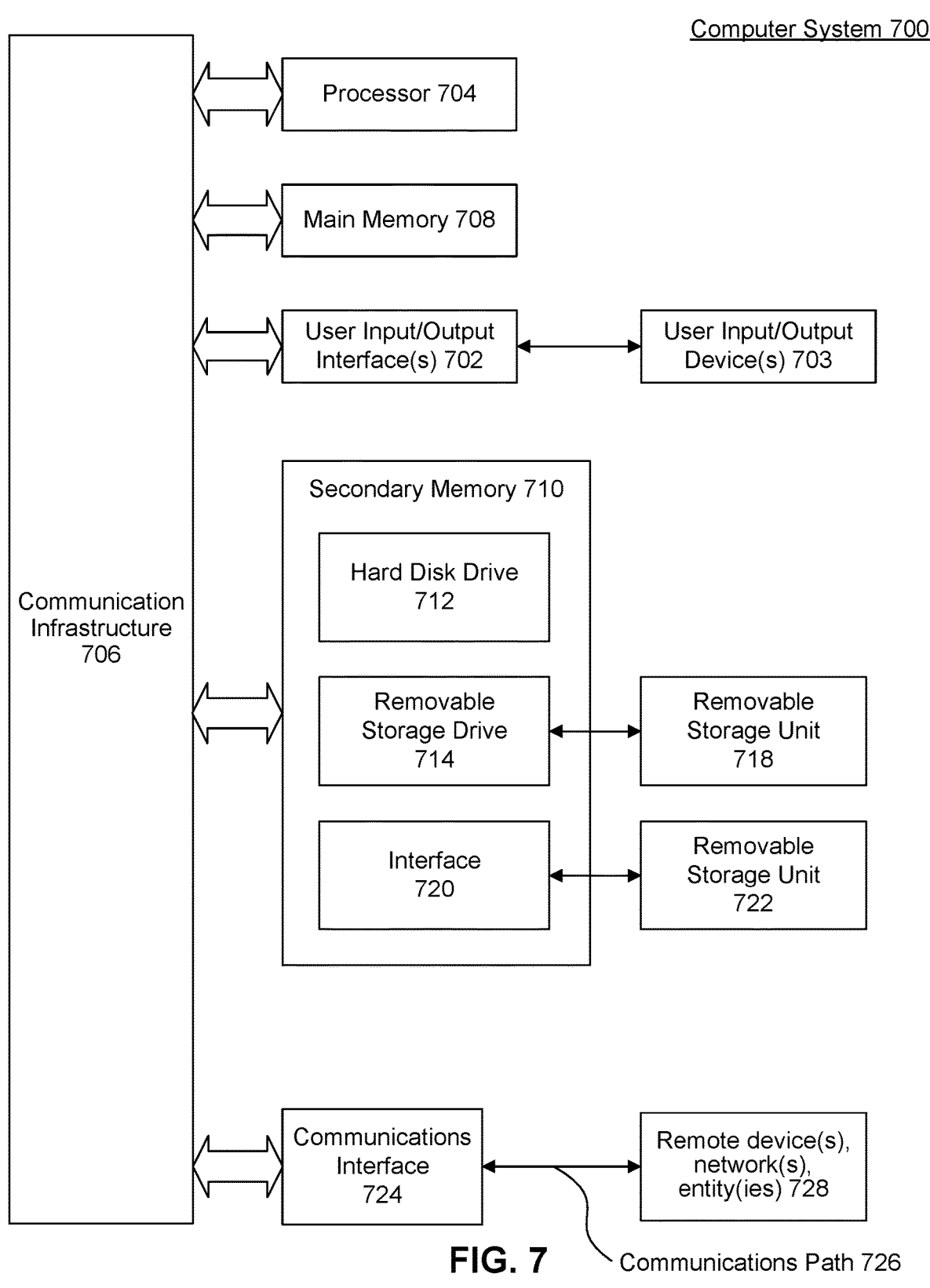
FIG. 7 illustrates an example computer system useful for implementing various embodiments.

Various embodiments and/or components therein can be implemented, for example, using one or more computer systems, such as computer system 700 shown in FIG. 7. Computer system 700 can be any computer or computing device capable of performing the functions described herein. For example, one or more computer systems 700 can be used to implement any embodiments, and/or any combination or sub-combination thereof.

Computer system 700 includes one or more processors (also called central processing units, or CPUs), such as a processor 704. Processor 704 is connected to a communication infrastructure or bus 706. Computer system 700 may represent or comprise one or more systems on chip (SOC).

One or more processors 704 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 can include one or more levels of cache. Main memory 708 has stored therein control logic (i.e., computer software) and/or data.

Computer system 700 can also include one or more secondary storage devices or memory 710. Secondary memory 710 can include, for example, a hard disk drive 712 and/or a removable storage device or drive 714. Removable storage drive 714 can be a floppy disk drive, a magnetic tape drive, a compact disk drive, an optical storage device, tape backup device, and/or any other storage device/drive.

Removable storage drive 714 can interact with a removable storage unit 718. Removable storage unit 718 includes a computer usable or readable storage device having stored thereon computer software (control logic) and/or data. Removable storage unit 718 can be a floppy disk, magnetic tape, compact disk, DVD, optical storage disk, memory card, and/any other computer data storage device. Removable storage drive 714 reads from and/or writes to removable storage unit 718 in a well-known manner.

According to an exemplary embodiment, secondary memory 710 can include other means, instrumentalities or other approaches for allowing computer programs and/or other instructions and/or data to be accessed by computer system 700. Such means, instrumentalities or other approaches can include, for example, a removable storage unit 722 and an interface 720. Examples of the removable storage unit 722 and the interface 720 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 can further include a communication or network interface 724. Communication interface 724 enables computer system 700 to communicate and interact with any combination of remote devices, remote networks, remote entities, etc. (individually and collectively referenced by reference number 728). For example, communication interface 724 can allow computer system 700 to communicate with remote devices 728 over communications path 726, which can be wired and/or wireless, and which can include any combination of LANs, WANs, the Internet, etc. Control logic and/or data can be transmitted to and from computer system 700 via communication path 726.

In some embodiments, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:

receiving, via a user interface, user input comprising a plurality of entries indicating what values are to be extracted from one or more documents by an artificial intelligence (AI) language processing system, comprising a pre-trained model, wherein each entry of the plurality of entries comprises a name identifying a field of information describing the values to be extracted from the one or more documents;

generating a schema for extracting the values from the one or more documents based on the name corresponding to each of the plurality of entries, the schema comprising the plurality of entries;

receiving text versions of the one or more documents;

generating, from a combination of the schema and the text versions of the one or more documents, a prompt for the AI language processing system;

providing the prompt to the AI language processing system;

receiving, responsive to the providing the prompt, a text-based output and a confidence score from the AI language processing system, wherein the confidence score represents a degree of correlation between the text-based output and the schema, the text-based output comprising the values that were identified and extracted from the one or more documents as corresponding to the name of each of the plurality of entries of the schema;

determining that the confidence score is greater than a threshold value;

based on the determining, converting the text-based output into a format to be stored on a database or displayed on the user interface; and updating an indicator on the user interface, the indicator corresponding to a status of the extraction of the values from the one or more documents.

13

2. The method of claim 1, wherein the converting comprises:

adding one or more instructions to the prompt indicating that a first portion of the prompt comprises the schema, and a second portion of the prompt comprises the text version of at least one of the one or more documents.

3. The method of claim 2, wherein the adding further comprises:

adding an instruction to the prompt indicating a format for the text-based output, wherein the text-based output is generated by the AI language processing system based on the format.

4. The method of claim 1, wherein the plurality of entries comprise at least one header field corresponding to a header found on a first document of the one or more documents, and at least one line item field corresponding to the first document.

5. The method of claim 1, wherein a first entry of the plurality of entries comprises a description that comprises supplemental information, as provided by a user via the user interface, for identifying the field of information corresponding to the name in the one or more documents.

6. The method of claim 5, wherein the supplemental information comprises one of: a format of a value contained in the field or a range of possible values contained in the field.

7. The method of claim 5, wherein the name is received from the user via a first user interface element, and the description is received from the user via a second user interface element.

8. The method of claim 1, wherein the updating comprises:

displaying, via the user interface, a first document from the one more documents simultaneously with the values extracted from the first document.

9. The method of claim 8, further comprising:

identifying a first output from the text-based output corresponding to the first document;

comparing the first output to data stored in a table of the database;

determining that the first output is not stored in the table of the database; and highlighting the first output on the values displayed in the user interface based on the determination that the first output is not stored in the table of the database.

10. The method of claim 9, further comprising:

receiving an indication from a user, via the user interface, whether the first output is correct, responsive to the highlighting.

11. The method of claim 1, wherein the one or more documents are unstructured documents.

12. The method of claim 1, wherein the receiving comprises receiving an optical character recognition (OCR) version of the one or more documents.

13. A system comprising at least one processor, the at least one processor configured to perform operations comprising:

receiving, via a user interface, user input comprising a plurality of entries indicating what values are to be extracted from one or more documents by an artificial intelligence (AI) language processing system, comprising a pre-trained model, wherein each entry of the plurality of entries comprises a name identifying a field of information describing the values to be extracted from the one or more documents;

generating a schema for extracting the values from the one or more documents based on the name corresponding to each of the plurality of entries, the schema comprising the plurality of entries;

receiving text versions of the one or more documents;

generating, from a combination of the schema and the text versions of the one or more documents, a prompt for the AI language processing system;

providing the prompt to the AI language processing system;

receiving, responsive to the providing the prompt, a text-based output and a confidence score from the AI language processing system, wherein the confidence score represents a degree of correlation between the text-based output and the schema, the text-based output comprising the values that were identified and extracted from the one or more documents as corresponding to the name of each of the plurality of entries of the schema;

determining that the confidence score is greater than a threshold value;

based on the determining, converting the text-based output into a format to be stored on a database or displayed on the user interface; and updating an indicator on the user interface, the indicator corresponding to a status of the extraction of the values from the one or more documents.

14. The system of claim 13, wherein the converting comprises:

adding one or more instructions to the prompt indicating that a first portion of the prompt comprises the schema, and a second portion of the prompt comprises the text version of at least one of the one or more documents.

15. The system of claim 14, wherein the adding further comprises:

adding an instruction to the prompt indicating a format for the text-based output, wherein the text-based output is generated by the AI language processing system based on the format.

16. The system of claim 13, wherein the plurality of entries comprise at least one header field corresponding to a header found on a first document of the one or more documents, and at least one line item field corresponding to the first document.

17. The system of claim 13, wherein a first entry of the plurality of entries comprises a description that comprises supplemental information, as provided by a user via the user interface, for identifying the field of information corresponding to the name in the one or more documents.

18. The system of claim 17, wherein the supplemental information comprises one of:

a format of a value contained in the field or a range of possible values contained in the field.

19. The system of claim 17, wherein the name is received from the user via a first user interface element, and the description is received from the user via a second user interface element.

20. A non-transitory computer-readable medium having instructions stored thereon that, when executed by at least one computing device, cause the at least one computing device to perform operations comprising:

receiving, via a user interface, user input comprising a plurality of entries indicating what values are to be extracted from one or more documents by an artificial intelligence (AI) language processing system, comprising a pre-trained model, wherein each entry of the plurality of entries comprises a name identifying a field of information describing the values to be extracted from the one or more documents;

generating a schema for extracting the values from the one or more documents based on the name corresponding to each of the plurality of entries, the schema comprising the plurality of entries;

receiving text versions of the one or more documents;

generating, from a combination of the schema and the text versions of the one or more documents, a prompt for the AI language processing system;

providing the prompt to the AI language processing system;

receiving, responsive to the providing the prompt, a text-based output and a confidence score from the AI language processing system, wherein the confidence score represents a degree of correlation between the text-based output and the schema, the text-based output comprising the values that were identified and extracted from the one or more documents as corresponding to the name of each of the plurality of entries of the schema;

determining that the confidence score is greater than a threshold value;

based on the determining, converting the text-based output into a format to be stored on a database or displayed on the user interface; and updating an indicator on the user interface, the indicator corresponding to a status of the extraction of the values from the one or more documents.

* * * * *